(12) United States Patent
Fountoulakis et al.

(10) Patent No.: US 7,640,895 B2
(45) Date of Patent: Jan. 5, 2010

(54) LEASH FOR PETS

(76) Inventors: Tzanis Fountoulakis, Domänenweg 1, D-32694 Dörentrup (DE); Steven B. Dunn, 2069 Coldwater Canyon, Beverly Hills, CA (US) 90210; Mark Hatherill, 2811 Pine Ave., Manhattan Beach, CA (US) 90266

( * ) Notice: Subject to any disclaimer, the term of this patent is extended or adjusted under 35 U.S.C. 154(b) by 527 days.

(21) Appl. No.: 11/260,325

(22) Filed: Oct. 27, 2005

(65) Prior Publication Data

US 2006/0102103 A1    May 18, 2006

Related U.S. Application Data

(63) Continuation-in-part of application No. 10/898,049, filed on Jul. 20, 2004, now abandoned, which is a continuation of application No. PCT/DE03/00159, filed on Jan. 21, 2003.

(30) Foreign Application Priority Data

Jan. 21, 2002    (DE) ............................ 202 03 731 U

(51) Int. Cl.
   *A01K 27/00* (2006.01)
(52) U.S. Cl. ........................................ 119/795; 119/791
(58) Field of Classification Search ................ 119/795, 119/791, 792, 793, 797, 798; D30/153
   See application file for complete search history.

(56) References Cited

U.S. PATENT DOCUMENTS

| | | | | |
|---|---|---|---|---|
| 2,861,547 A | * | 11/1958 | Dale | 119/797 |
| 3,752,127 A | * | 8/1973 | Baker | 119/797 |
| 4,266,511 A | | 5/1981 | Muench | |
| 4,763,609 A | * | 8/1988 | Kulik | 119/797 |
| 4,817,562 A | | 4/1989 | Giroux | |
| 4,892,063 A | * | 1/1990 | Garrigan | 119/795 |
| 5,154,660 A | | 10/1992 | Snyder et al. | |
| 5,184,573 A | | 2/1993 | Stevens, Jr. | |
| 5,501,180 A | | 3/1996 | Beere | |
| 5,511,293 A | * | 4/1996 | Hubbard et al. | 24/442 |
| 5,666,909 A | * | 9/1997 | Dupre | 119/797 |
| 5,718,192 A | * | 2/1998 | Sebastian | 119/795 |
| 5,724,920 A | * | 3/1998 | Meisman et al. | 119/771 |
| 5,839,394 A | * | 11/1998 | Dickison | 119/795 |
| 5,848,576 A | | 12/1998 | Colaianni | |
| 5,873,328 A | | 2/1999 | Campbell | |
| 5,915,336 A | * | 6/1999 | Watson | 119/797 |
| 6,053,129 A | * | 4/2000 | Akre | 119/795 |

(Continued)

FOREIGN PATENT DOCUMENTS

CA    1 174 917    9/1984

(Continued)

*Primary Examiner*—Yvonne R. Abbott
(74) *Attorney, Agent, or Firm*—Knoble Yoshida & Dunleavy, LLC

(57) ABSTRACT

A significantly improved leash has a strap or belt with a carabiner at a lower end and a loop at an upper end. The loop may be a preconfigured holding loop or it may be an adjustable loop that can be adjusted by clipping a carabiner into eyelets in the leash. The leash permits even an animal that is pulling strongly on the leash to be held in check, by a hand grip disposed in the holding loop, or adjacent to the holding loop.

28 Claims, 6 Drawing Sheets

U.S. PATENT DOCUMENTS

| | | |
|---|---|---|
| 6,125,793 A | 10/2000 | Petty |
| 6,216,636 B1 | 4/2001 | Butchko |
| D454,670 S * | 3/2002 | Weller .................. D30/153 |
| 6,450,129 B1 * | 9/2002 | Flynn ..................... 119/770 |
| 6,453,851 B1 * | 9/2002 | Holt et al. ............... 119/795 |
| 6,467,437 B2 * | 10/2002 | Donovan et al. ......... 119/798 |
| 6,513,460 B2 | 2/2003 | Fountoulakis |
| 6,637,377 B2 * | 10/2003 | Lobanoff et al. ......... 119/792 |
| 6,772,711 B2 * | 8/2004 | Morgan .................. 119/795 |
| 6,789,671 B2 * | 9/2004 | Morrison et al. ......... 206/388 |
| 6,827,045 B1 * | 12/2004 | Willner et al. ........... 119/795 |
| 7,114,467 B2 * | 10/2006 | Jones ..................... 119/795 |
| 2001/0015179 A1 | 8/2001 | Fountoulakis |
| 2002/0005174 A1 * | 1/2002 | Meissner ................ 119/795 |
| 2004/0112303 A1 * | 6/2004 | Moulton, III ........... 119/795 |
| 2005/0000470 A1 | 1/2005 | Fountoulakis |
| 2007/0034166 A1 * | 2/2007 | Brooks ................... 119/867 |
| 2007/0102240 A1 * | 5/2007 | Wilson ..................... 182/5 |

FOREIGN PATENT DOCUMENTS

| | | |
|---|---|---|
| CA | 2 398 944 | 8/2001 |
| CA | 2 473 391 | 7/2003 |
| EP | 0 065 509 | 5/1982 |
| WO | WO 01/58253 | 8/2001 |
| WO | WO 03/059050 | 7/2003 |

* cited by examiner

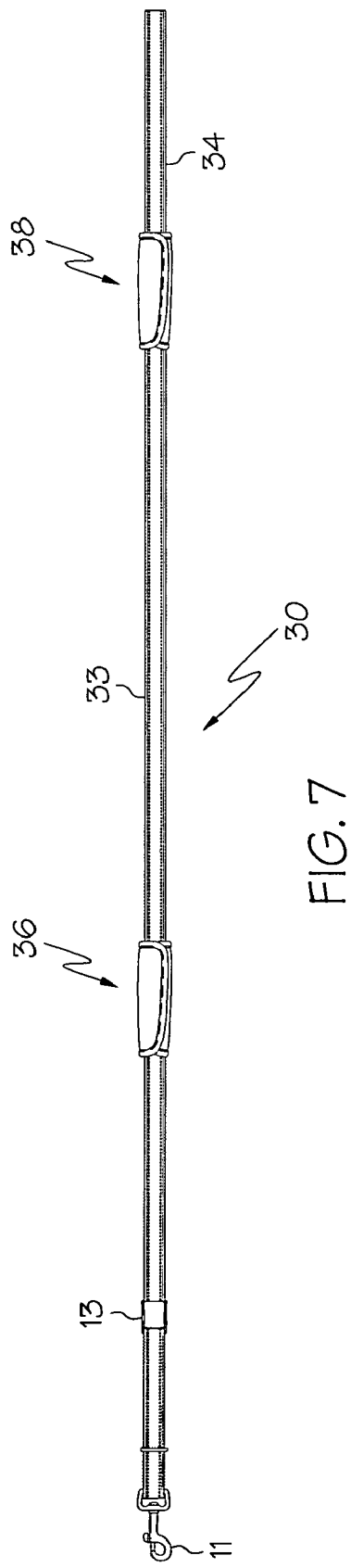
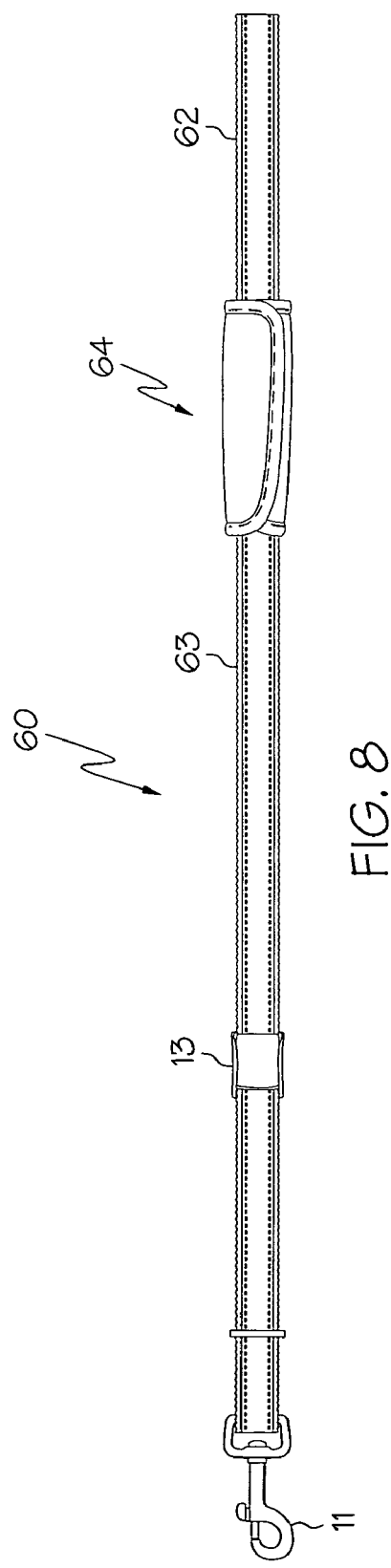

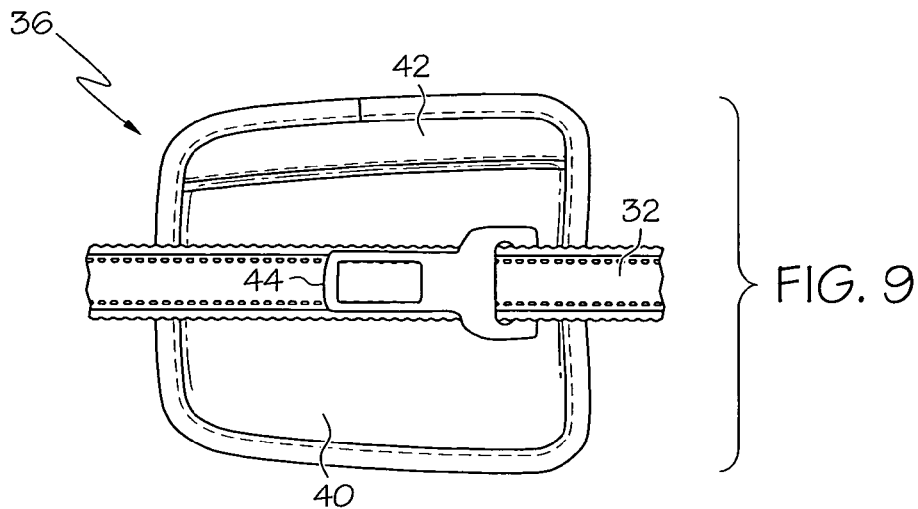
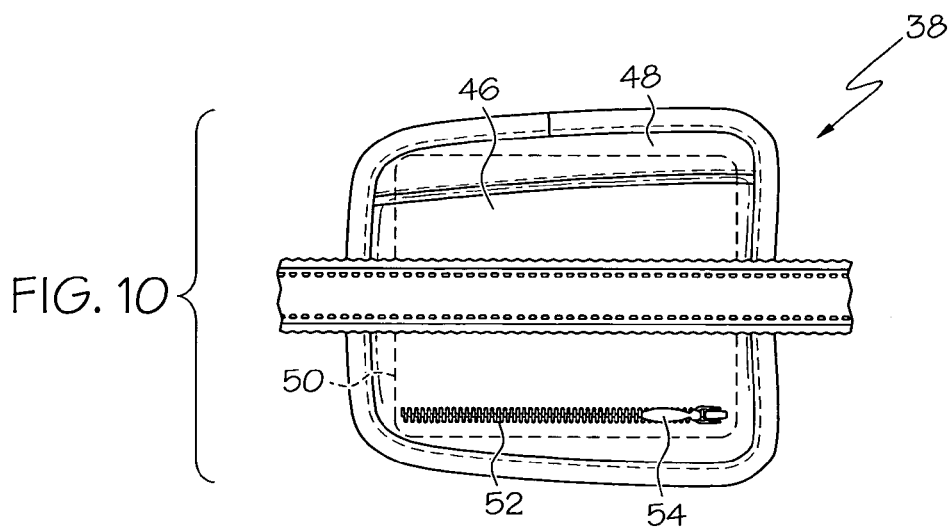
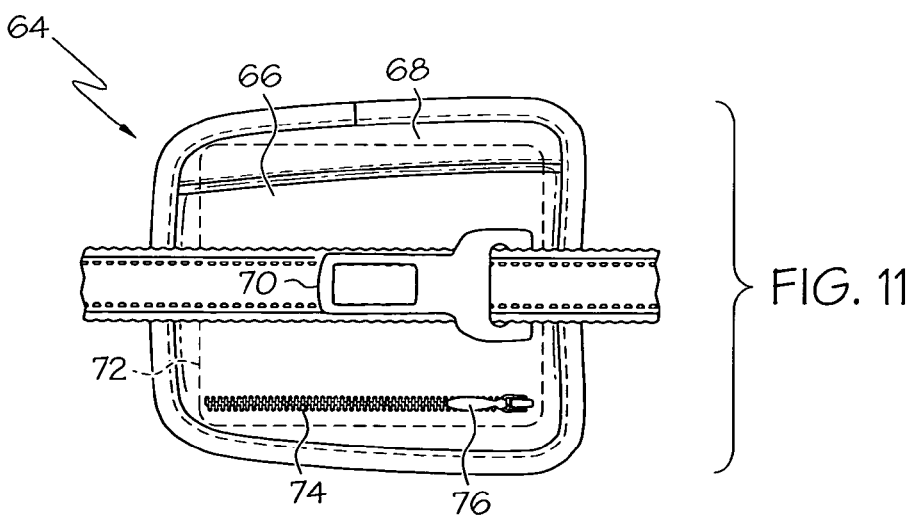

LEASH FOR PETS

CROSS-REFERENCE TO RELATED APPLICATIONS

This application is a continuation-in-part of application Ser. No. 10/898,049, filed Jul. 20, 2004 now abandoned, which is a continuation of copending international application No. PCT/DE03/00159, filed Jan. 21, 2003, which designated the U. S.; this application also claims the priority, under 35 U.S.C. § 119, of German patent application No. 202 03 731.2, filed Jan. 21, 2002; the prior applications are hereby incorporated by reference in their entirety as if set forth fully herein.

BACKGROUND OF THE INVENTION

1. Field of the Invention

This invention relates to leashes, or leads, of the type having a strap or belt and a carabiner hook or snap hook at a bottom end, for attaching to an animal's collar or harness. The strap or belt further has a retaining loop at a top end. The loop is either fixed or it can be adjusted by engaging a carabiner hook or a snap hook in eyelets disposed along the leash.

2. Description of the Related Technology

Conventional short or long leashes can be used to leash animals, in particular dogs, with a greater or lesser clearance. Such known leashes usually have, at their ends, retaining loops which make it possible to control an animal that pulls strongly on the leash. In many cases, such retaining loops nevertheless do not provide a firm grip for a hand holding the leash, with the result that it is possible that a thin leash cannot be reliably secured in every position and for an animal to break away together with the leash. Furthermore, these known leashes cannot be utilized, at any rate without further accessories, for reliably transporting animals in motor vehicles.

SUMMARY OF THE INVENTION

It is accordingly an object of the invention to provide an improved leash, which overcomes the above-mentioned disadvantages of the heretofore-known devices and methods of this general type.

With the foregoing and other objects in view there is provided, in accordance with a first aspect of the invention, a leash including a strap with an attachment device at a bottom end thereof, for attaching to an animal's collar or harness; a retaining loop at a top end of the strap; and a handgrip disposed at or adjacent the retaining loop, the handgrip containing a closure part secured on the strap and configured for attachment to a buckle of a motor vehicle seat belt, the handgrip including a sheath enclosing the enclosure part and including a closure for selectively opening and closing the sheath lengthwise, the closure part and the sheath together forming the handgrip.

According to a second aspect of the invention, a leash includes a strap with an attachment device at a bottom end thereof, for attaching to an animal's collar or harness; a retaining loop at a top end of the strap; and a handgrip disposed at or adjacent the retaining loop, the handgrip containing a closure part secured on the strap and configured for attachment to a buckle of a motor vehicle seat belt, wherein the closure part is formed in two parts with a base plate, formed with a through-passage, and a buckle part, secured on the base plate via an articulation and having two different locking buckles for mutually different motor vehicle seat belt buckle receivers.

A leash that is constructed according to a third aspect of the invention includes a strap with an attachment device at a bottom end thereof, for attaching to an animal's collar or harness; gripping structure at a top end of the strap for enabling a person to grip the strap; and a handgrip disposed at or adjacent the gripping structure, the handgrip containing a closure part secured on the strap and configured for attachment to a buckle of a motor vehicle seat belt, the handgrip including a sheath enclosing the enclosure part and including a closure for selectively opening and closing the sheath lengthwise, the closure part and the sheath together forming the handgrip.

A leash according to a fourth aspect of the invention includes a strap with an attachment device at a bottom end thereof, for attaching to an animal's collar or harness; gripping structure at a top end of the strap for enabling a person to grip the strap; and a handgrip disposed at or adjacent the gripping structure, the handgrip containing a closure part secured on the strap and configured for attachment to a buckle of a motor vehicle seat belt, wherein the closure part is formed in two parts with a base plate, formed with a through-passage, and a buckle part, secured on the base plate via an articulation and having two different locking buckles for mutually different motor vehicle seat belt buckle receivers.

According to a fifth aspect of the invention, a leash includes a strap with an attachment device at a bottom end thereof, for attaching to an animal's collar or harness; and a handgrip containing a closure part secured on the strap and configured for attachment to a buckle of a motor vehicle seat belt, the handgrip including a sheath enclosing the enclosure part and including a closure for selectively opening and closing the sheath lengthwise, the closure part and the sheath together forming the handgrip, and wherein a storage pocket is defined in the sheath.

According to a sixth aspect of the invention, a leash includes a strap with an attachment device at a bottom end thereof, for attaching to an animal's collar or harness; a sheath secured to the strap; and a storage pocket defined within the sheath.

A leash that is constructed according to a seventh aspect of the invention includes a strap with an attachment device at a bottom end thereof, for attaching to an animal's collar or harness; a first sheath secured to the strap, the first sheath having a locking part connected thereto for securing the leash to an automobile seat belt fastener; a second sheath secured to the strap; and a storage pocket defined within the second sheath.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 7 is a side elevational view depicting a leash that is constructed according to a second embodiment of the invention;

FIG. 8 is a side elevational view depicting a leash that is constructed according to a third embodiment of the invention;

FIG. 9 is a fragmentary view depicting a portion of the leash that is shown in FIG. 7;

FIG. 10 is a fragmentary view depicting another portion of the leash that is shown in FIG. 7; and FIG. 11 is a fragmentary view depicting a portion of the leash that is shown in FIG. 8.

DETAILED DESCRIPTION OF THE PREFERRED EMBODIMENT(S)

Figure 1:
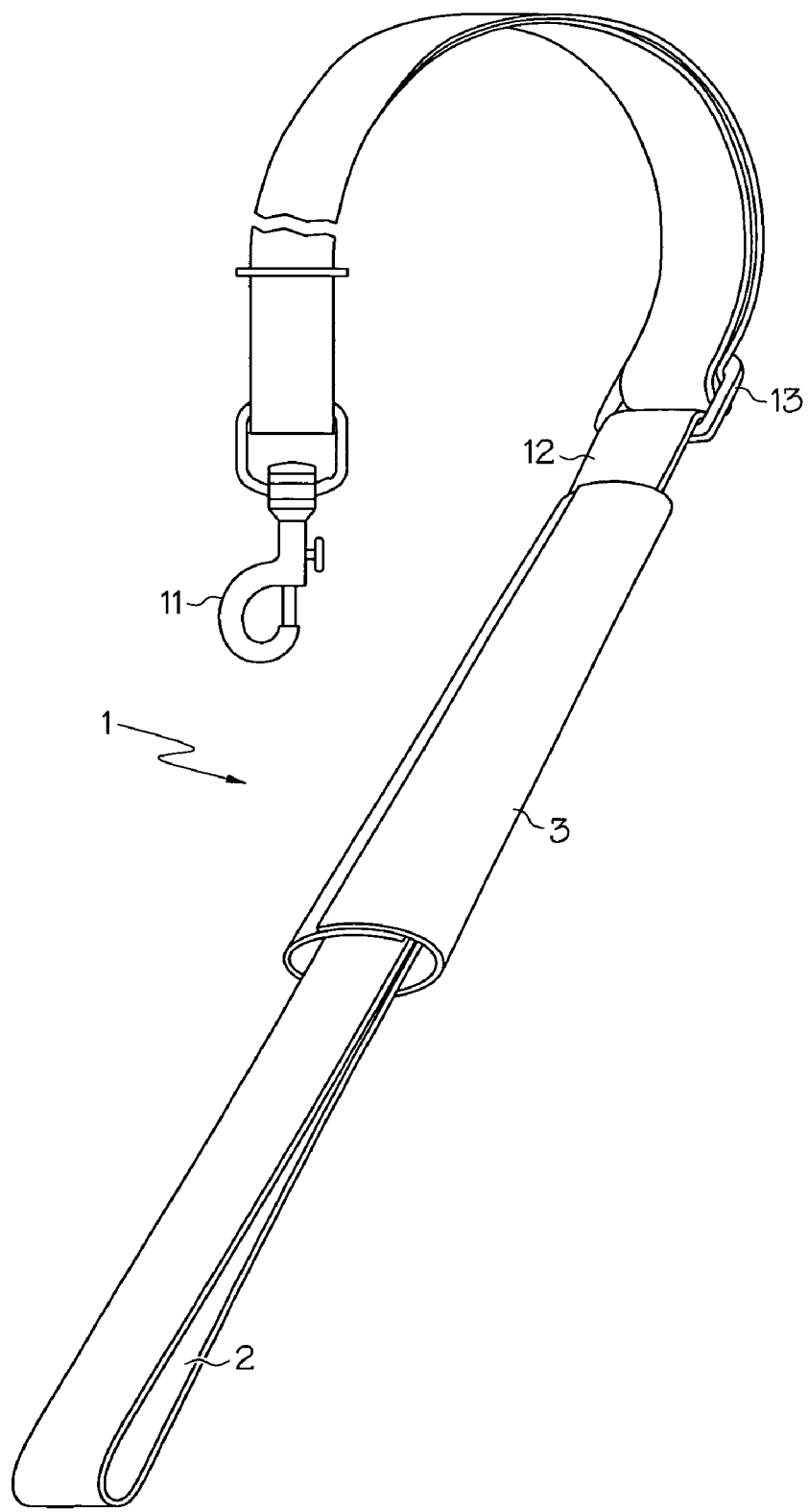
FIG. 1 is a perspective view showing a leash that is configured as a short leash with a prefabricated retaining loop.

The retaining loop may be a prefabricated retaining loop and/or an adjustable retaining loop formed by engaging a snap hook in eyelets along the strap. In other words, the novel leash, similarly to prior art leashes, includes a strap or belt with a carabiner hook at a bottom end, for attaching to an animal using a collar or a harness, and a prefabricated retaining loop, and/or one which can be produced by engaging a carabiner hook in spaced-apart eyelets, at its top end. The leash according to this aspect of the invention also has, in the retaining loop or directly in front of the latter, a dimensionally stable or other handgrip which makes it possible for a leash to be gripped and secured such that it cannot slip out between the fingers of a hand, with the result that even strong animals can be led securely using a leash equipped with such a handgrip.

According to a particularly preferred embodiment of the invention, the handgrip contains a buckle of a motor vehicle seat belt, which is secured on the leash and can be moved out of the handgrip. The closure part may be substantially the same length as the handgrip and be produced from metal and thus forming the rigid core of the handgrip.

In accordance with a particularly advantageous embodiment of the invention, the handgrip comprises the closure part and a sheath which is itself provided with a closure, by which it can be opened and closed over its length, for example with a touch-and-close fastener, with the result that the closure part is easily accessible and is just as easy to stow away again. This inventive leash thus ensures that it is always possible to carry along a seat belt without it being necessary to provide or carry along within the motor vehicle any further necessary components which, accordingly, also cannot be forgotten or left lying around.

Such a closure part advantageously has a locking section and a fastening section which has a through-passage, through which the strap or the belt of the leash extends, with the result that it can be adjusted in position on the leash or is secured in a certain position, for example by transverse seams in a doubled region of the leash, but can be moved into any desired angled position in relation to the leash.

It is also preferably possible for the closure part of the leash according to the invention to be formed in two parts and to comprise a base plate, with a through-passage for fastening the base plate on the leash, and the actual closure part, which is secured on the base plate via an articulation and, furthermore, is equipped with two different locking sections for different motor-vehicle seat belt locks, with the result that the application area of the leashes is further increased to a considerable extent.

In the case of a particularly advantageous embodiment of the invention, the carabiner hook is spaced apart from the closure part by a distance which corresponds to that of a motor-vehicle seat belt lock and the collar or harness of an animal sitting or lying on a seat, or an area provided for this purpose, in a motor vehicle, with the result that it is also possible, if desired, for the room for movement for an animal in a motor vehicle to be significantly reduced. It is also advantageously possible to adjust this distance via the graduated length of the leash, which can be produced by engaging the carabiner hook into different eyelets of the leash.

The leash may also be configured as a long leash or as a short leash, the retaining loop, in the latter case, being arranged directly behind the closure part, with the result that a person can guide his/her hand through the retaining loop and can then grip the handgrip, a dimensionally stable and ergonomic retaining device being produced as a result.

Figure 2:
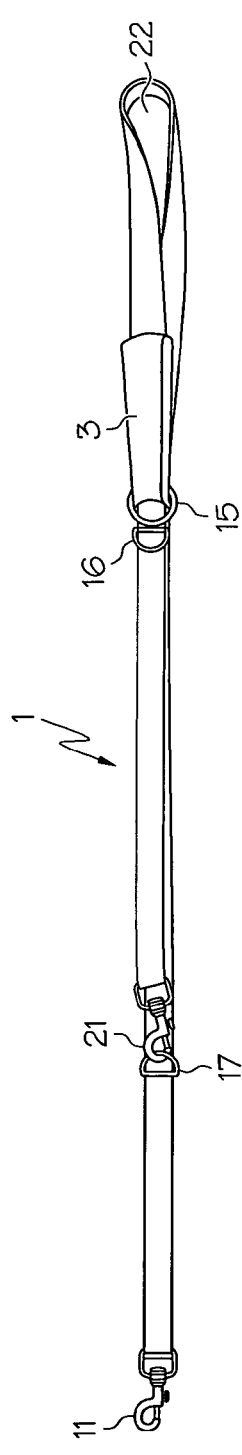
FIG. 2 is a side view of a long leash with a variable, adjustable retaining loop.

Referring now to the figures of the drawing in detail and first, particularly, to FIG. 1 thereof, there is shown a leash or lead 1 that comprises a strap 12 or belt, preferably made of leather or a braided plastic, and has, at the top end, either a prefabricated retaining loop 2 or a retaining loop 22 (cf. FIG. 2) which can be produced by engaging a snap hook or carabiner hook 21 in eyelets 15; 16; 17 of the leash 1. The leash 1 further has a snap hook or carabiner hook 11 at a bottom end, and also adjusting clasps 13, via which the length of the leash 1 can be adapted as desired. The snap hooks or carabiner hooks described and shown herein are but exemplary attachment devices and it will be understood that several equivalent attachment devices may be available.

Figure 5:
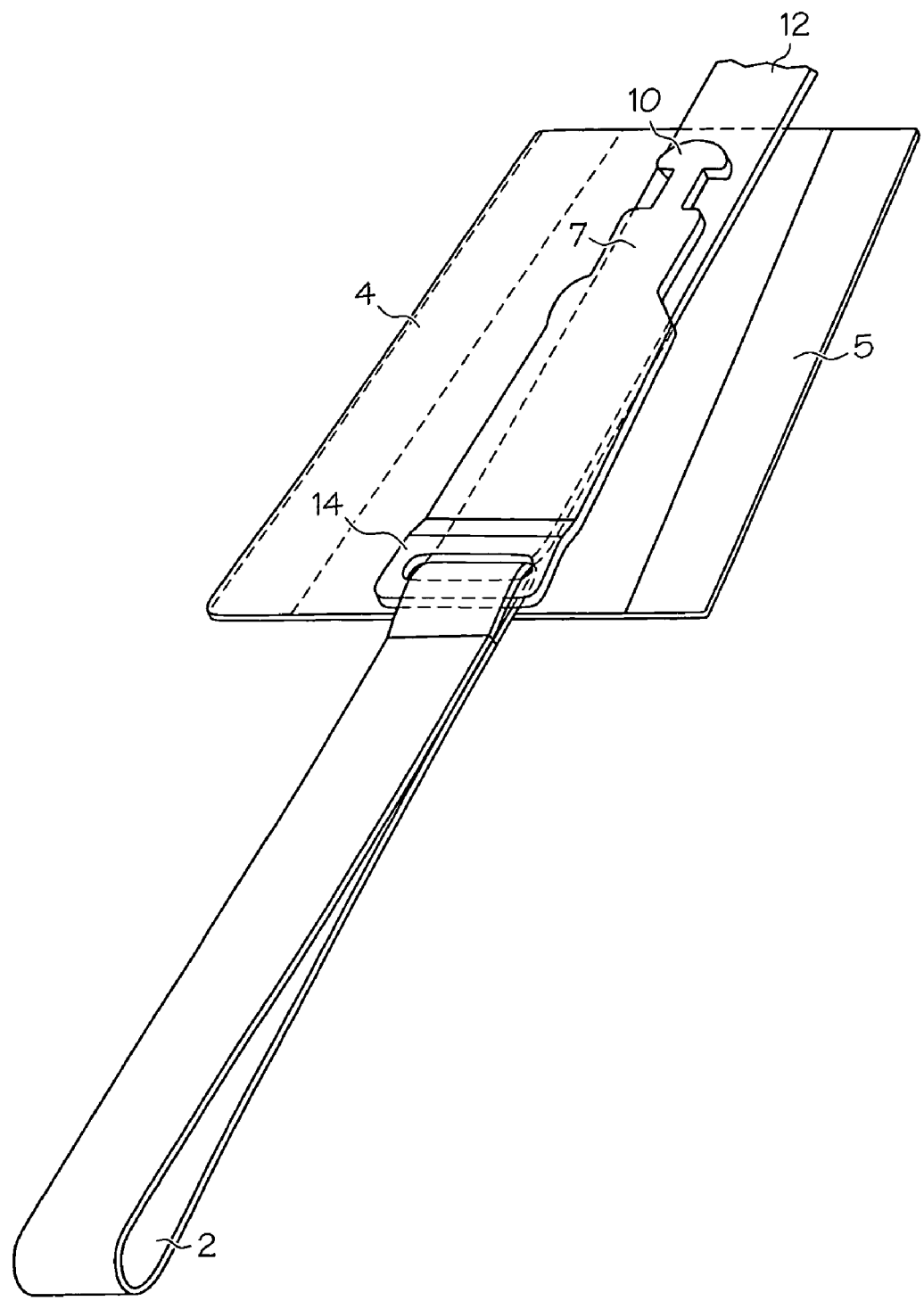
FIG. 5 is a perspective view of the grip end of the leash according to FIG. 1 with the sheath open.

The embodiment of the leash 1 which is illustrated in FIGS. 1 and 5 is designed as a short leash. In the region directly behind the retaining loop 2, it has a handgrip 3, which comprises a sheath 4 in which is formed a closure part 7 which has a through-passage 14, through which the strap or the belt of the leash 1 extends and is secured by transverse seams provided therein. Arranged at that end of the closure part 7 which is opposite to the through-passage 14 is a locking section 10 similar to a seat belt buckle. The locking section can be introduced into a large number of conventional motor vehicle seat belt buckle receivers.

Figure 6:
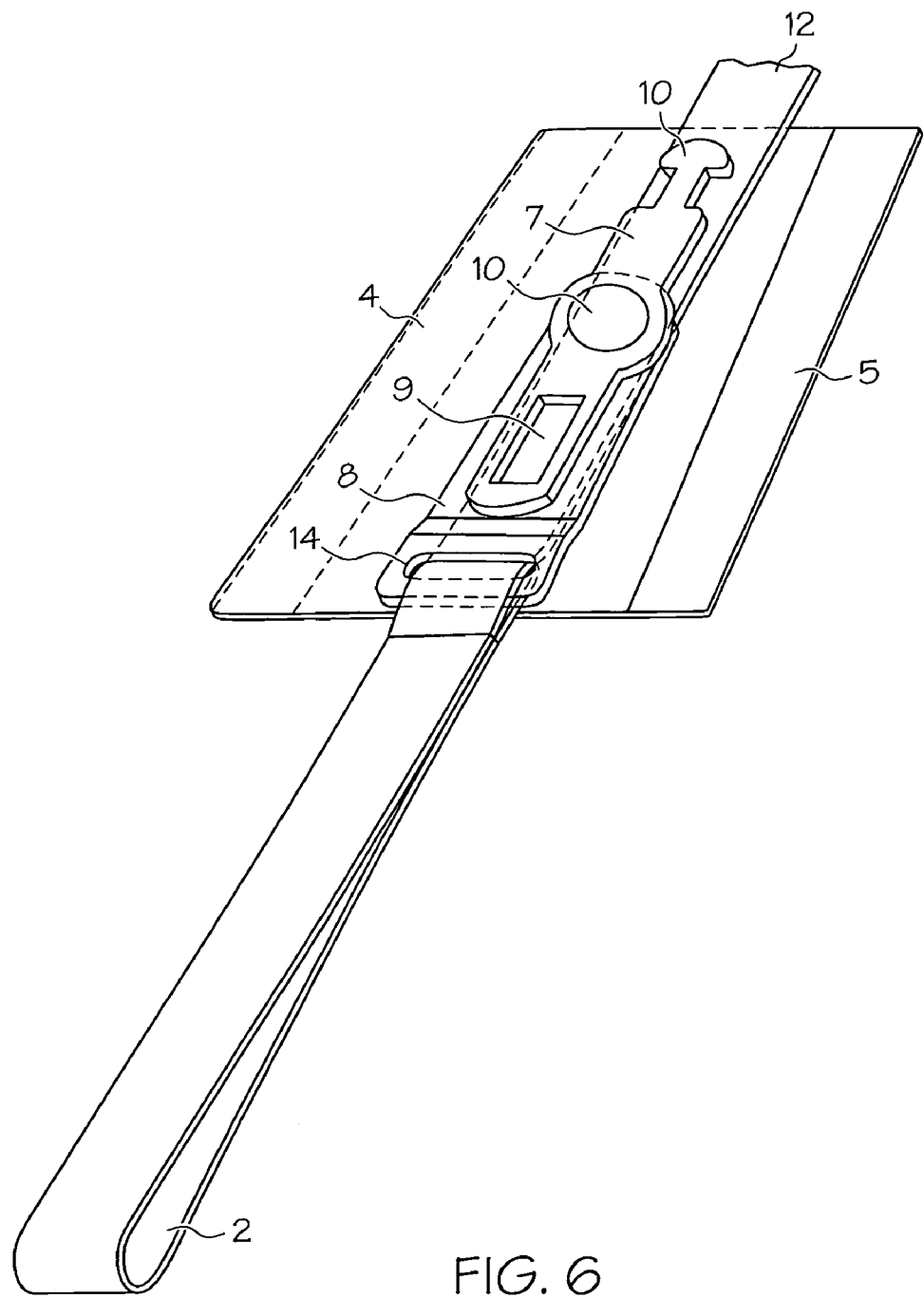
FIG. 6 is a perspective view showing an open sheath of a handgrip with a closure part having two different locking sections.

A closure part as is illustrated in FIG. 6 has a base plate 8, with a through-passage 14, and an articulation 6, via which two locking sections 9; 10 of the closure part 7 can optionally be rotated into an operational position, with the result that, with this type of closure part, it is possible to utilize all common seat belt locks for strapping an animal in a motor vehicle using a seat belt.

Figure 3:
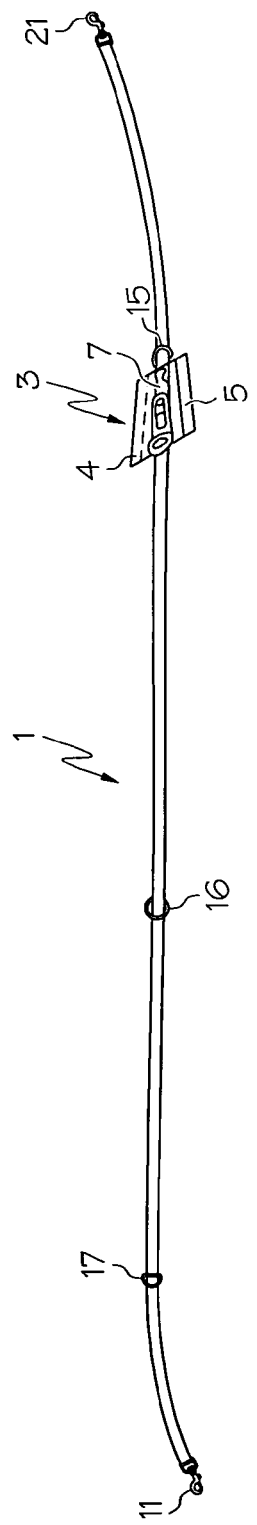
FIG. 3 is a similar view of an entire length of the leash according to FIG. 2 in a reduced-scale illustration.
Figure 4:
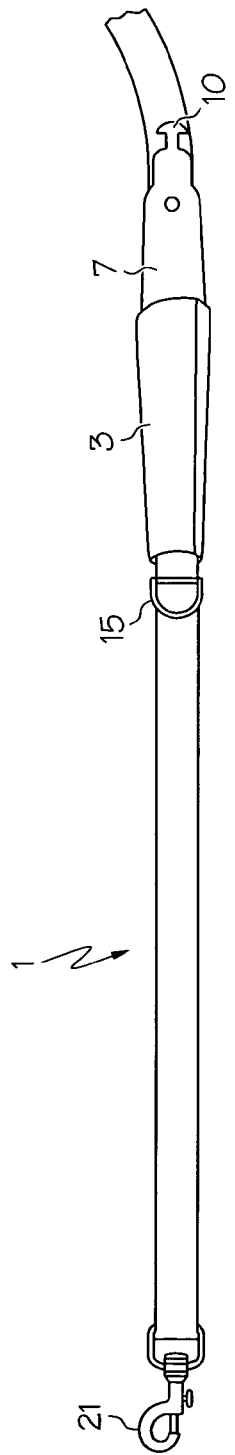
FIG. 4 is a similar view of the leash according to FIG. 3 with the seat belt function activated.

As is illustrated in FIG. 3, it is also possible for a leash 1 to be designed as long leash and to be provided with a second snap hook or carabiner hook 21 and with different eyelets 15; 16; 17 over the length of the leash 1, it being possible for an eyelet 15 to be disposed, for example, in front of the handgrip 3, for an eyelet to be spaced apart behind the handgrip 3 and for an eyelet 17 to be arranged in the end region of the leash 1, with the result that engaging the carabiner hook 21 into the first eyelet 15 gives a prefabricated retaining loop in a form similar to FIG. 1 and, for example, engaging the carabiner hook 21 into the last eyelet 17 of the leash 1 gives a vastly shortened leash 1 with a retaining loop 22 through which a hand can likewise be guided before the handgrip 3 is gripped, with the result that the user can choose the use position which is most comfortable or seems to be most expedient.

The sheath 4 of the handgrip 3 preferably has a hook-and-loop fastener 5, such as mating Velcro® strips. The fasteners 5 allow the sheath 4 to be easily fastened around the closure part 7 enclosing the rigid core of the handgrip 3 or the closure part 7 connected to the base plate 8.

A leash 30 that is constructed according to a second preferred embodiment of the invention is depicted in FIGS. 7, 9 and 10. Leash 30 includes an elongated strap or belt 32 that is connected to a snap hook or carabiner hook 11 at a first end and to a retaining loop 34 at a second, opposite end. In the preferred embodiment, the preferred total length of the leash 30 is preferably within a range of about 4 feet to about 9 feet. As in the previously described embodiment, at least one adjusting clasp 13 is provided for adjusting the length of the leash 30.

As FIG. 7 shows, a first sheath 36 is provided and is secured to the strap or belt 32 at a location that is substantially intermediate between the first and second ends of the strap or belt 32, and a second sheath 38 is secured at a location that is proximate to the retaining loop 34. Referring to FIG. 9, it will be seen that the first sheath 36 preferably includes a flexible web 40 material preferably having more than one ply and that preferably includes an internal padding material. A fastener that is preferably a hook and loop type fastener 42 is provided so that the flexible web 40 can be folded and secured in position over itself and over the elongated strap or belt 32 in the configuration that is depicted in FIG. 7. A locking part 44 that is shaped so as to be releasably securable to an automobile seat belt buckle is secured with respect to the strap or belt 32 and the first sheath 36. The flexible web 40 is sized and shaped so that it will wrap around and provide cushioning and protection to the locking part 44 when the locking part 44 is not in use.

Referring now to FIG. 10, it will be seen that the second sheath 38 is also preferably fabricated from a multi-ply, preferably padded flexible web 46 that is similarly provided with a fastener that is preferably a hook and loop type fastener 48. According to one advantageous feature of the invention, a storage pocket 50 is preferably defined within the flexible web 46, and a zipper closure 52 having a pull-tab 54 is preferably provided to access and close the storage pocket 50. Storage pocket 50 is preferably sized so as to be capable of storing articles such as personal effects like keys, credit cards and identification cards, and/or pet care articles such as waste bags for pet cleanup. Alternatively, a different type of closure such as a hook and loop type fastener closure could be provided in lieu of the zipper closure 52.

A leash 60 that is constructed according to a third preferred embodiment of the invention is shown in FIGS. 8 and 11. Leash 60 has an elongated strap or belt 63 having a first end that is connected to a snap hook or carabiner hook 11 and a second end that is configured as a retaining loop 62. Leash 60 preferably has a total length that is within a range of about 3 feet to about 7 feet, and is provided with at least one adjusting clasp 13 for adjusting the overall length. A sheath 64 is preferably secured to the elongated strap or belt 63 and, as is best shown in FIG. 11, is preferably fabricated from a flexible web material 66 that has more than one ply and that is preferably padded. A fastener that is preferably a hook and loop type fastener 68 is provided to enable the flexible web material 66 to be folded over itself into the configuration that is depicted in FIG. 8. A locking part 70 that is shaped so as to be releasably securable to an automobile seat belt buckle is secured with respect to the strap or belt 63 and the sheath 64. The flexible web material 66 is preferably sized and shaped so that it will wrap around and provide cushioning and protection to the locking part 70 when the locking part 70 is not in use.

In addition, an internal storage pocket 72 is preferably defined within the flexible web material 66, and a zipper closure 74 having a pull tab 76 is preferably provided to access and close the storage pocket 72. Storage pocket 72 is preferably sized so as to be capable of storing articles such as personal effects like keys, credit cards and identification cards, and/or pet care articles such as waste bags for pet cleanup. Alternatively, a different type of closure such as a hook and loop type fastener closure could be provided in lieu of the zipper closure 74.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A leash, comprising:
    a strap with an attachment device at a bottom end thereof, for attaching to an animal's collar or harness;
    a retaining loop at a top end of said strap; and
    a handgrip disposed at or adjacent said retaining loop, said handgrip containing a closure part secured on said strap and configured for attachment to a buckle of a motor vehicle seat belt, said handgrip including a sheath enclosing said closure part and including a closure for selectively opening and closing said sheath lengthwise, said closure part and said sheath together forming said handgrip.

2. The leash according to claim 1, wherein said retaining loop is a prefabricated retaining loop.

3. The leash according to claim 1, wherein said retaining loop is an adjustable retaining loop formed by engaging a snap hook in eyelets along said strap.

4. The leash according to claim 1, wherein said attachment device is a carabiner hook or a snap hook.

5. The leash according to claim 1, wherein said closure part is formed with a locking section and a fastening section having a through-passage for guiding said strap therethrough.

6. The leash according to claim 1, wherein said attachment device is spaced apart from said closure part by a distance corresponding to a distance between a motor vehicle seat belt buckle receiver a collar or harness of an animal sitting or lying in the motor vehicle.

7. The leash according to claim 6, wherein said strap is an adjustable length strap configured to enable adjusting the distance between said closure part and said attachment device.

8. The leash according to claim 1 configured as a short leash, wherein said retaining loop is disposed directly behind said closure part, and a dimensionally stable, ergonomic retaining device is formed for a person's hand guided through said retaining loop and by said handgrip, comprising a closure part and a sheath, gripped by the person's hand.

9. A leash, comprising:
    a strap with an attachment device at a bottom end thereof, for attaching to an animal's collar or harness;
    a retaining loop at a top end of said strap; and
    a handgrip disposed at or adjacent said retaining loop, said handgrip containing a closure part secured on said strap and configured for attachment to a buckle of a motor vehicle seat belt, wherein said closure part is formed in two parts with a base plate, formed with a through-passage, and a buckle part, secured on said base plate via an articulation and having two different locking buckles for mutually different motor vehicle seat belt buckle receivers.

10. A leash, comprising:
- a strap with an attachment device at a bottom end thereof, for attaching to an animal's collar or harness;
- gripping means at a top end of said strap for enabling a person to grip said strap; and
- a handgrip disposed at or adjacent said gripping means, said handgrip containing a closure part secured on said strap and configured for attachment to a buckle of a motor vehicle seat belt, said handgrip including a sheath enclosing said closure part and including a closure for selectively opening and closing said sheath lengthwise, said closure part and said sheath together forming said handgrip.

11. The leash according to claim 10, wherein said gripping means comprises a prefabricated retaining loop.

12. The leash according to claim 10, wherein said gripping means comprises an adjustable retaining loop formed by engaging a snap hook in eyelets along said strap.

13. The leash according to claim 10, wherein said attachment device is a carabiner hook or a snap hook.

14. The leash according to claim 10, wherein said closure part is formed with a locking section and a fastening section having a through-passage for guiding said strap therethrough.

15. A leash, comprising:
- a strap with an attachment device at a bottom end thereof, for attaching to an animal's collar or harness;
- gripping means at a top end of said strap for enabling a person to grip said strap; and
- a handgrip disposed at or adjacent said gripping means, said handgrip containing a closure part secured on said strap and configured for attachment to a buckle of a motor vehicle seat belt, wherein said closure part is formed in two parts with a base plate, formed with a through-passage, and a buckle part, secured on said base plate via an articulation and having two different locking buckles for mutually different motor vehicle seat belt buckle receivers.

16. The leash according to claim 15, wherein said attachment device is spaced apart from said closure part by a distance corresponding to a distance between a motor vehicle seat belt buckle receiver a collar or harness of an animal sitting or lying in the motor vehicle.

17. The leash according to claim 16, wherein said strap is an adjustable length strap configured to enable adjusting the distance between said closure part and said attachment device.

18. The leash according to claim 15, wherein said gripping means comprises a retaining loop that is disposed directly behind said closure part, and a dimensionally stable, ergonomic retaining device is formed for a person's hand guided through said retaining loop and by said handgrip, comprising a closure part and a sheath, gripped by the person's hand.

19. A leash, comprising:
- a strap with an attachment device at a bottom end thereof, for attaching to an animal's collar or harness; and
- a handgrip containing a closure part secured on said strap and configured for attachment to a buckle of a motor vehicle seat belt, said handgrip including a sheath enclosing said closure part and including a closure for selectively opening and closing said sheath lengthwise, said closure part and said sheath together forming said handgrip, and wherein a storage pocket is defined in said sheath.

20. The leash according to claim 19, further comprising closure means for opening and closing said storage pocket.

21. The leash according to claim 20, wherein said closure means comprises a zipper fastener.

22. A leash, comprising:
- a strap with an attachment device at a bottom end thereof, for attaching to an animal's collar or harness;
- a first sheath secured to said strap, said first sheath having a locking part connected thereto for securing said leash to an automobile seat belt fastener;
- a second sheath secured to said strap; and
- a storage pocket defined within said second sheath.

23. The leash according to claim 22, further comprising closure means for opening and closing said storage pocket.

24. The leash according to claim 23, wherein said closure means comprises a zipper fastener.

25. The leash according to claim 22, further comprising fastening means for securing said first sheath in a folded over position.

26. The leash according to claim 25, wherein said fastening means comprises a hook and loop type fastener.

27. The leash according to claim 22, further comprising fastening means for securing said second sheath in a folded over position.

28. The leash according to claim 27, wherein said fastening means comprises a hook and loop type fastener.

* * * * *

UNITED STATES PATENT AND TRADEMARK OFFICE
CERTIFICATE OF CORRECTION

PATENT NO.        : 7,640,895 B2                                Page 1 of 1
APPLICATION NO.   : 11/260325
DATED             : January 5, 2010
INVENTOR(S)       : Fountoulakis et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 962 days.

Signed and Sealed this

Sixteenth Day of November, 2010

David J. Kappos
*Director of the United States Patent and Trademark Office*